United States Patent Office 3,189,090
Patented June 15, 1965

3,189,090
TREATMENT OF AN UNDERGROUND
FORMATION
Francis J. Mitch, Houston, and Reeves B. Perry, Bellaire, Tex., assignors to Texaco Inc., New York, N.Y., a corporation of Delaware
No Drawing. Filed Aug. 8, 1961, Ser. No. 129,973
8 Claims. (Cl. 166—32)

This invention relates to the treatment of permeable underground formations. More particularly, this invention relates to a process of treating permeable underground formations to reduce substantially the porosity and/or permeability thereof.

There are a number of known procedures for treating permeable underground formations to render them substantially impermeable. One common procedure has been to inject liquid cement into permeable formations, and then to permit the cement to set therein. This procedure renders the formation substantially fluid-impermeable. Another known procedure comprises injecting into an underground permeable formation one treating solution followed by a second treating solution. The introduced solutions react with each other within the formation with the result that solid materials are deposited therefrom which plug the formation.

Each of these prior art procedures for plugging or reducing the porosity and/or permeability of underground formations has some disadvantage. Cement plugging is sometimes difficult to control particularly when liquid cement is to be injected into relatively tight low permeability formations. The use of two treating solutions to plug a formation has the disadvantage that a skin-plugging effect occurs at the interface of the treating solutions within the formation. Further, with two treating solutions it is difficult to obtain the desired intimate admixture of these solutions within the formation undergoing treatment.

Accordingly, it is an object of this invention to provide an improved method for treating permeable underground formations to reduce the porosity and/or permeability thereof, and particularly the water permeability.

Still another object of this invention is to provide a method whereby a single, homogeneous treating solution is employed to plug or to effect at least a partial reduction in the porosity and/or permeability of an underground formation.

A further object of this invention is to provide a formation plugging method or a method for reducing the porosity of permeable underground formations wherein there is caused to be deposited within the pores or interstices of the formation a substantially water-impermeable gel.

How these and other objects of this invention are accomplished will become apparent with reference to the accompanying disclosure. In at least one embodiment of the practice of this invention at least one of the foregoing objects will be obtained.

We have now discovered that an improved method of treating a permeable underground formation to reduce its porosity and permeability comprises introducing into a water-containing formation a water-insoluble fatty acid monoglyceride in an amount sufficient, on contacting the water portion thereof, to form a water-impermeable gel therewith. The resultant formed gel serves to plug and/or reduce the porosity and water permeability of the formation.

In carrying out the process of this invention, the fatty acid monoglyceride is introduced in the liquefied state into the formation to be treated or it is introduced as a solution, the monoglyceride being dissolved or dispersed in a liquid organic solvent such as an oxygenated hydrocarbon solvent containing from 1 to 10 carbon atoms.

The fatty acid monoglyceride treating agent of this invention has the following general formula

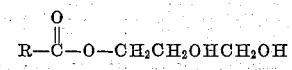

wherein R is an aliphatic hydrocarbyl group containing 13 to 23 carbon atoms, preferably 15 to 19 carbon atoms. Among the representative fatty acid monoglyceride compounds suitable as treating agents include the monoglycerides of saturated fatty acids, such as myristic, palmitic, stearic, arachidic and behenic acid as well as unsaturated fatty acids such as palmitoleic, oleic, linoleic and linolenic acids and also mixtures of the above saturated and unsaturated fatty acids. In particular, fatty acid moieties containing 16 to 20 carbon atoms are to be preferred. A particular preferred fatty acid monoglyceride is glycerol monooleate. Fatty acid monoglycerides wherein the fatty acid moiety contains less than 14 carbon atoms such as lauric acid monoglyceride are not suitable for they do not form gels on contact with water.

The normally liquid or liquefiable fatty acid monoglyceride treating agents of the present invention can be injected directly into the formation without employing a solvent therefor. However, it is desirable that a solvent solution thereof be employed in carrying out the process of this invention because the rate of and degree of plugging the formation can be more readily controlled thereby.

Suitable liquid organic solvents are, for example, the polar oxygenated hydrocarbon solvents including aliphatic alcohols, ketones and esters containing 1 to 10 carbon atoms, as well as mixtures thereof. Preferred solvents are ethanol, propanol, isopropanol, butanol, acetone, ethyl ketone, methyl ethyl ketone, methyl propyl ketone and methyl isopropyl ketone. Particularly preferred solvents are isopropanol and acetone.

As indicated hereinabove, it is preferred in the practice of this invention to employ solutions of the water-insoluble fatty acid monoglyceride treating agents. By employing solutions, particularly saturated solutions at relatively elevated temperatures, such as a temperature in the range 70–150° F., depending upon the solvent employed, an increased amount of treating agent may be introduced into the formation undergoing treatment per volume of treating solution, thereby effecting a more complete plugging or treatment of the formation per volume of treating solution. However, the use of less than saturated solutions of fatty acid monoglyceride or of the glyceride without a solvent therefor have been found to be satisfactory. We have found that concentrations of from 5 to 90% fatty acid monoglyceride in a solvent have proved to be satisfactory in carrying out the process of this invention.

Various formations are suitably treated in accordance with the practice of this invention to alter or reduce the porosity and/or permeability thereof to water. Formations which are suitably treated include water-producing formations and oil-water-producing formations. The practice of this invention is particularly suitable for the treatment of water-producing formations to reduce the water permeability thereof and for the treatment of oil-producing formations which concomitantly produce water or formation brine. In accordance with one embodiment the practice of this invention is applicable to reduce or avoid water coning such as sometimes arises when an oil-producing formation is produced at a location adjacent or close to a water-producing formation and wherein during the production of oil, water in excessive amounts is also produced.

In a treatment in accordance with the practice of this invention to inhibit or eliminate water coning there is introduced into the oil-producing formation at or near the zone of oil production, or into the water-producing formation itself, from which water coning arises, a suitable amount of the fatty acid monoglyceride treating agent of this invention. The amount of treating agent introduced is sufficient to substantially reduce the water permeability of that portion of the formation into which the treating agent has been injected. Usually an amount of treating agent sufficient to treat the formation for a distance of about 5 to 100 radial feet from the point or area of injection is satisfactory.

In accordance with another embodiment of the practice of this invention satisfactory results may be obtained when a hydrocarbon mineral oil or a crude oil is admixed with the treating agent of this invention, such as an amount of oil in the range 5–75% by volume based on the resulting total treating fluid.

In accordance with yet another embodiment of the practice of this invention a relatively hot saturated treating solution of the fatty acid monoglyceride such as a solution of glycerol monooleate in a suitable organic solvent, for example, acetone, at a temperature in excess of 100° F., such as a temperature in the range 125 to 175° F., is introduced into a permeable underground formation to be treated. Upon introduction of the hot treating solution into the relatively cold formation and on contact with the water in the formation a water-impermeable gel of glycerol monooleate is formed. The resulting formed gel serves to reduce the porosity and/or permeability of the thus-treated underground formation at and about the area thereof wherein the treating solution comes in contact with the water portion of the formation.

The following examples illustrate the process of this invention.

EXAMPLE 1

A sand pack was prepared with white blasting sand in a permeameter cell and after evacuation and saturation of the pack with a 5% sodium chloride brine solution, glycerol monooleate, which had been heated to the liquid state, in an amount of 22 ml., was injected into the sand pack. The pack plugged when the injected liquid came into contact with the brine solution. The pack was shut-in for 17 hours and thereafter a pressure of 0.930 atmosphere was applied to the pack for 4 hours. There was no brine flow. The pack was dismantled; a portion of the sand removed from the end for inspection; the pack was reassembled, and reverse brine flow started. There was evidence of channeling in the pack caused by the reverse brine flow. However, there was a 98%+ reduction in the permeability of the pack.

The data observed in carrying out this test are summarized in Table I.

Table I

| | | |
|---|---|---|
| Cell length | cm | 38 |
| Cell diameter | cm | 3.4 |
| Bulk volume | ml | 346 |
| Pore volume | ml | 119 |
| Porosity | percent | 34.4 |
| Permeability to 5 percent brine | millidarcys | 9000 |
| Volume solution injected (100% glycerol monooleate) | ml | 22 |
| Shut-in period | hours | 17 |
| Test temperature | °F | 122 |
| Permeability after injection: | | |
| (a) | | 0 |
| (b) | millidarcys | 126 |
| Reduction in permeability: | | |
| (a) | percent | 100 |
| (b) | do | 98+ |

(a) Determined before a portion of the sand was removed from the pack.

(b) Determined after a portion of the sand was removed. The sand grains were cemented together by the gel.

EXAMPLE 2

In another example illustrative of the practice of this invention, a sand pack was prepared as described in Example 1, evacuated and saturated with a 5% brine solution. Into the reuslting brine-saturated sand pack maintained at a temperature of 78° F. there was injected 7 ml. of glycerol monooleate. The pack plugged during injection of the liquid.

The results of this test are recorded in Table II below.

Table II

| | | |
|---|---|---|
| Cell length | cm | 37.5 |
| Cell diameter | cm | 3.4 |
| Bulk volume | ml | 340 |
| Pore volume | ml | 117 |
| Porosity | percent | 34.4 |
| Permeability | millidarcys | 7400 |
| Volume solution injected | ml | 7 |
| Temperature | °F | 78 |
| Shut-in period | | 0 |
| Permeability | | 0 |
| Reduction in permeability | percent | 100 |

EXAMPLE 3

(A) A sand pack was prepared as described in Example 1 and saturated with a 5 percent by volume brine solution.

There was injected into the sand pack 35 ml. of an acetone solution containing 50 percent by weight of glycerol monooleate, followed by an injection of 15 ml. of the 5 percent brine solution.

The results of this first injection are set forth in Table III below.

(B) The treated sand pack was permitted to remain standing for three days. Thereafter the sand pack was subjected to injections with 45 ml. of the acetone solution of glycerol monooleate and also 35 ml. of 5 percent brine solution. This series of injections were carried out in the following manner.

(1) 25 ml. of the glycerol monooleate-acetone solution.

(2) 10 ml. of the brine solution.

(3) 10 ml. of the glycerol monooleate-acetone solution.

(4) 10 ml. of the brine solution.

(5) 10 ml. of the glycerol monooleate-acetone solution.

(6) 15 ml. of the brine solution.

The results of this are also shown in Table III below.

Table III

| | | |
|---|---|---|
| Cell length | cm | 37.5 |
| Cell diameter | cm | 3.4 |
| Bulk volume | ml | 340 |
| Pore volume | ml | 117 |
| Porosity | percent | 34.4 |
| Permeability | millidarcys | 7400 |

| | | 1st injection | 2nd injection |
|---|---|---|---|
| Volume solution injected | ml | 35 | 45 |
| Shut-in period | | 3 days | Overnight |
| Temperature | °F | 78 | 78 |
| Permeability | millidarcys | 4,100 | 2,050 |
| Total reduction in permeability | percent | 44.5 | 72.5 |

This example demonstrates that the permeability of a sand pack previously injected with the fatty acid monoglyceride treating agents of this invention can be further reduced by additional injections of the fatty acid monoglyceride.

EXAMPLE 4

(A) A sand pack was prepared as described in Example 1 and saturated with a 5 percent by volume brine solution. The resulting sand pack was then injected with 90 ml. of an acetone solution containing 50 percent by weight of a fatty acid monoglyceride, the fatty acid portion thereof being obtained from hydrogenated lard (a mixture of myristic, palmitic, stearic, oleic and linoleic acids).

The fatty acid monoglyceride-acetone solution was injected into the sand pack in 10 ml. portions, each portion being followed by a 5 ml. portion of 5 percent brine solution until a total of 90 ml. of each had been injected therein. The results of this test are shown in Table IV below.

(B) The resulting treated sand pack was permitted to stand overnight at a temperature of about 78° F.

Thereafter, an additional 100 ml. of the same fatty acid monoglyceride-acetone solution employed above was injected into the sand pack. In this injection, successive 10 ml. portions of the fatty acid monoglyceride-acetone solution were employed, each 10 ml. portion thereof being followed by a 10 ml. portion of the brine solution. The resulting treated sand pack was permitted to remain overnight and its permeability was then determined. The results are also set forth in Table IV below.

Table IV

| | |
|---|---|
| Cell length _____ cm__ | 37 |
| Cell diameter _____ cm__ | 3.4 |
| Bulk volume _____ ml__ | 337 |
| Pore volume _____ ml__ | 103 |
| Porosity _____ percent__ | 30.6 |
| Permeability _____ millidarcys__ | 6200 |
| Temperature _____ ° F__ | 78 |

| | 1st injection | 2nd injection |
|---|---|---|
| Total volume solution injected_____ml__ | 90 | 100 |
| Shut-in Period_____ | Overnight | Overnight |
| Permeability_____millidarcys__ | 2,500 | 1,200 |
| Reduction in Permeability_____percent__ | 59.5 | 52 |
| Total Reduction in Permeability_____do____ | 59.5 | 80 |

EXAMPLE 5

In another test, a sand pack prepared as in Example 1 and saturated with a 5% brine solution, was injected with 60 ml. of an isopropanol solution of the same fatty acid monoglyceride mixture as used in Example 4. The solution contained 7% by weight of the fatty acid monoglyceride. Thereafter, 20 ml. of 5% brine solution was injected into the pack. The results of this test are presented in Table V.

Table V

| | |
|---|---|
| Cell length _____ | 34 cm. |
| Cell diameter _____ | 3.3 cm. |
| Bulk volume _____ | 291 ml. |
| Pore volume _____ | 103 ml. |
| Porosity _____ | 35.4%. |
| Temperature _____ | 78° F. |
| "Shut-in" period _____ | Overnight. |
| Solution injected _____ | 7% (wt.) fatty acid monoglyceride, the fatty acid being obtained from hydrogenated lard in isopropanol. |
| Original permeability __ | 5250 millidarcys. |
| Volume solution injected _____ | (1) 60 ml. solution. (2) 20 ml. 5% brine. |
| Permeability after injection _____ | 1030 millidarcys. |
| Reduction of permeability _____ | 80%. |

The foregoing examples clearly demonstrate the efficacy of the process of the invention in reducing the porosity and/or the permeability of a formation. One of the major advantages of the process of the present invention is that the glycerol monoglyceride forms a gel almost immediately on coming in contact with water.

In carrying out the practice of this invention it is preferred to admix or to prepare the treating solution at the well head of the well bore in communication with the permeable underground formation to be treated. Also, any suitable amount of treating solution might be prepared depending upon the results desired. For example, an amount of treating solution in the range of about 25 to 50,000 barrels might be prepared depending upon the porosity of the formation. Generally, it is desirable in the practice of this invention, particularly when it is sought to plug a permeable water-producing formation, to first shut down the well for a period of time, e.g., a few days (1-7 days), in order to attain equilibrium conditions and then to introduce into the water-producing formation a sufficient amount of treating solution to effect a reduction in water permeability thereof or to completely plug the same.

As will be apparent to those skilled in the art many modifications, substitutions and alterations are possible in the practice of this invention without departing from the spirit or scope thereof.

We claim:

1. A process of treating an underground water containing formation to render said formation less water permeable which comprises introducing into the formation a fatty acid monoglyceride in which the fatty acid portion thereof contains at least 14 carbon atoms whereby on contact with the water in said formation a water insoluble fatty acid monoglyceride gel is formed.

2. A process as claimed in claim 1 wherein said fatty acid monoglyceride is glycerol monooleate.

3. A process as claimed in claim 1 wherein said fatty acid monoglyceride is glycerol esterified with a mixture of hydrogenated lard fatty acids.

4. A process as claimed in claim 1 wherein the fatty acid portion of said fatty acid monoglyceride contains from 16 to 20 carbon atoms.

5. A process as claimed in claim 1 wherein the fatty acid monoglyceride is introduced into the formation in a liquid organic solvent.

6. A process as claimed in claim 5 wherein said solvent is an oxygenated hydrocarbon solvent containing 1 to 10 carbon atoms.

7. A process as claimed in claim 5 wherein said solvent is acetone.

8. A process as claimed in claim 5 wherein said solvent is isopropanol.

References Cited by the Examiner

UNITED STATES PATENTS

| | | | |
|---|---|---|---|
| 2,348,484 | 5/44 | Lawton _____ | 166—30 |
| 2,842,206 | 7/58 | Bearden et al. _____ | 166—33 |
| 3,051,236 | 8/62 | Mitch et al. _____ | 166—32 |

OTHER REFERENCES

Brokaw et al., "The Behavior of Distilled Mono-glycerides in the Presence of Water," The Journal of the American Oil Chemists Society, January 1958, vol. XXXV, No. 1, pp. 49-52.

CHARLES E. O'CONNELL, *Primary Examiner.*